United States Patent [19]

Mahrenholz

[11] Patent Number: 5,214,962
[45] Date of Patent: Jun. 1, 1993

[54] CONSTANT-RESISTANCE SIGNAL CONDITIONER FOR DYNAMIC STRAIN MEASUREMENT

[75] Inventor: Bob G. Mahrenholz, Tullahoma, Tenn.

[73] Assignee: Sverdrup Technology, Inc., Arnold Air Force Station, Tenn.

[21] Appl. No.: 755,069

[22] Filed: Sep. 5, 1991

[51] Int. Cl.⁵ .............................. G01B 7/18
[52] U.S. Cl. ............................ 73/766; 324/721
[58] Field of Search .............. 73/766, 862.63, 708; 338/8; 324/721

[56] References Cited

U.S. PATENT DOCUMENTS 2,844,775  7/1958  Miller et al. .......... 73/766 X
3,294,943  12/1966  Lorenz et al. .......... 324/721 X Primary Examiner—Jerry W. Myracle
Attorney, Agent, or Firm—Kenyon and Kenyon

[57] ABSTRACT

A dynamic strain measurement circuit includes a constant resistance conditioner. The constant resistance conditioner compensates for changes in lead wire resistance due to temperature. The conditioner includes adjustable resistance connected between a voltage supply and the strain gage. A potential difference is detected in the circuit and compared to a reference potential. Differences between the reference potential and the detected potential produce an error signal which is used to drive the control of the resistance value of the adjustable resistance in the measurement circuit.

5 Claims, 2 Drawing Sheets

CONSTANT-RESISTANCE SIGNAL CONDITIONER FOR DYNAMIC STRAIN MEASUREMENT

BACKGROUND OF THE INVENTION

The present invention relates to a dynamic strain measurement circuit, and more particularly, to a circuit design for maintaining a constant output from the circuit despite changes in lead-wire resistance.

Strain gages are typically used to measure dynamic stress on an object. One typical field in which a strain gage is used is in the monitoring of dynamic stress on turbine and compressor blades in turbo jet engine testing. Usually these strain gages are single active arm strain gages. The lead wires connected to these strain gages are typically of a small diameter with a high resistance.

Changes in temperature can effect changes in the effective resistance of the lead wires. This change is significant when compared to the change in gage resistance from the strain. Because there is no direct access to the gage itself, it is not possible to use three and four wire resistance measurement techniques to detect or compensate for these resistance fluctuations. Furthermore, it is not possible to connect the signal conditioner guard shield to a source of common mode voltage.

It has been known to provide one of two different types of signal conditioners: a) a conditioner having a constant voltage excitation supply; and b) a conditioner having a constant current excitation supply. The constant voltage type conditioner has excellent common-mode rejection of unwanted signals. However, such a conditioner is sensitive to changes to the resistance of the lead wires going to the strain gage. Constant current conditioners are immune to such lead wire resistance changes However, because of their inherently unbalanced output impedances, such constant current conditioners typically have very poor common-mode rejection. In addition, because of their wide active band width, constant current conditioners are typically noisier than constant voltage conditioners.

Thus, the problem exists of providing common mode rejection and a minimization of the impact of changes in lead wire resistance.

SUMMARY OF THE INVENTION

The present invention solves the above described problem by providing a constant voltage supply and compensation for changes in lead wire resistance.

In an embodiment of the present invention, adjustable resistance is added to the strain measurement circuit loop that already includes the strain gage and the constant voltage supply. A voltage difference between two points in the measurement loop is compared to a reference voltage. To the extent that there are differences between the measured voltage and the reference voltage, an error signal is produced. This error signal is used to drive changes in the adjustable resistances. Thus, as the resistance of the lead wires increases with temperature, the control resistances can be adjusted to decrease and consequently maintain the same resistance throughout the dynamic strain measurement circuit. The compensation for changes in lead wire resistance is slowed so as to avoid canceling out a rapid resistance change in the circuit that is due to changes of the strain gage itself as it is subjected to strain.

In a more detailed embodiment of the present invention, the adjustable resistances are light responsive resistances whose resistance is adjusted by adjusting current through an adjacent lamp or light emitting diode. It is also possible that the adjustable resistances can take the form of a motor driven potentiometer where the motor is driven in response to the error signal. Also it is possible that the adjustable resistances can take the form of field effect transistors where the control signal can adjust the gate voltage and thus effect the channel width of the field effect transistor.

DETAILED DESCRIPTION

Figure 1:
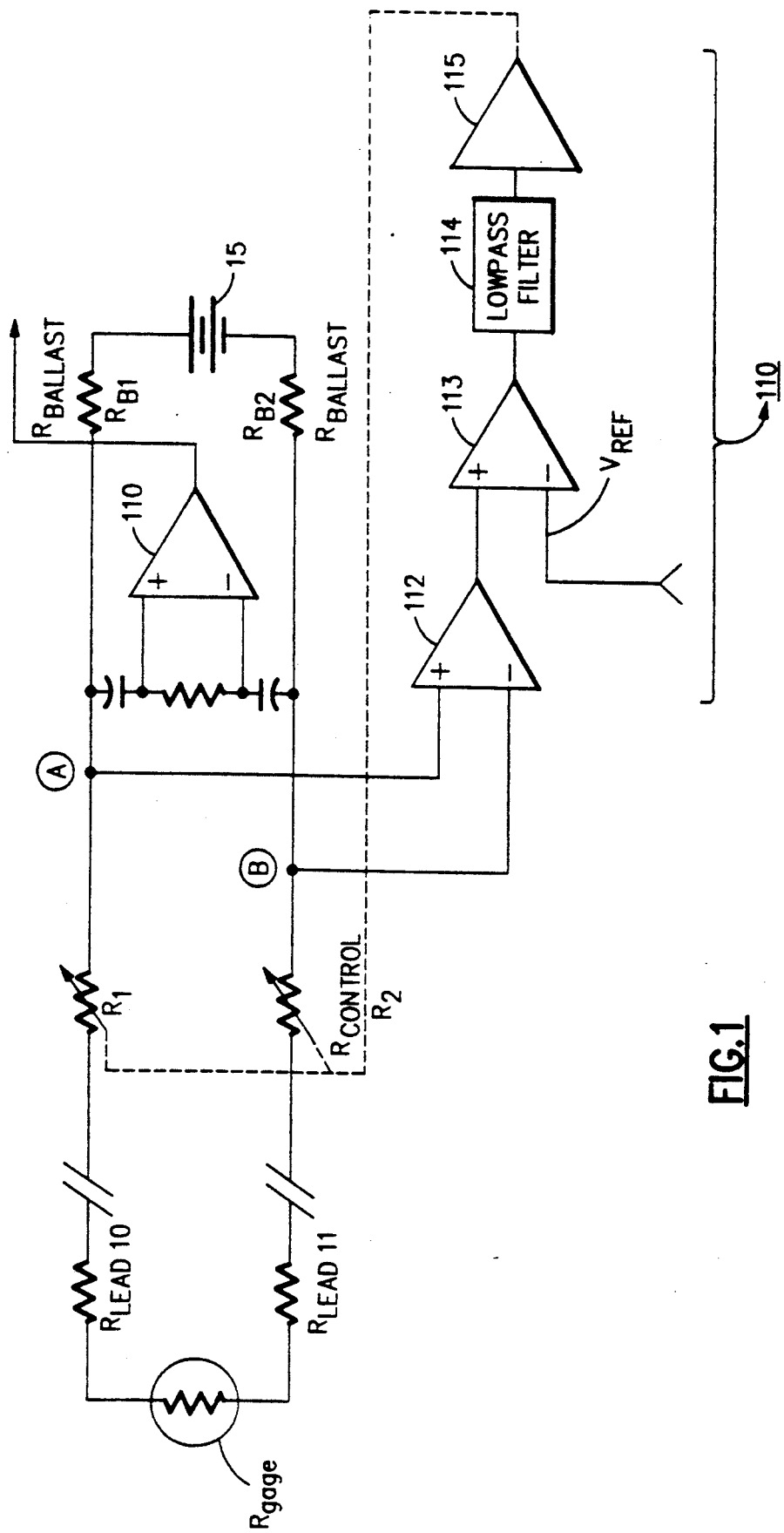
FIG. 1 is a functional diagram of a first embodiment of the present invention.

In FIG. 1, $R_{gage}$ corresponds to the resistance of the strain gage in a dynamic strain measurement device of the present invention Resistances $R_{lead10}$ and $R_{lead11}$ correspond to the effective resistance of the lead wires 10 and 11 connected to the strain gage. Adjustable resistances R1 and R2 are connected to resistances $R_{lead10}$ and $R_{lead11}$ respectively. Adjustable resistance R1 is connected to the constant voltage supply 15 which has associated with it ballast resistances RB1 and RB2. Similarly, adjustable resistance R2 is also connected to the constant voltage supply.

The voltage difference between points A and B is detected by an instrumentation amplifier 110 whose output constitutes a voltage signal which is indicative of the strain detected by the strain gage $R_{gage}$. Capacitors C1 and C2 serve to couple only the dynamic or a-c component of the strain signal at points A and B into amplifier 110. The resistance compensation circuit of the present invention is connected to the same potential points as the instrumentation amplifier.

The compensation circuit 111 includes an instrumentation amplifier 112 having its "+" terminal connected to point A of the dynamic strain measurement circuit and its "−" terminal connected to point B of the dynamic strain measurement circuit. The instrumentation amplifier 112 produces a voltage difference signal as an output, where the output is indicative of a potential difference between point A and point B in the dynamic strain measurement circuit The output of the instrumentation amplifier is provided to the "+" terminal of an error amplifier 113. A reference voltage is supplied to the "−" terminal of that same error amplifier. The output of the error amplifier 113 is an error signal indicative of a difference between the expected voltage difference at points A and B, and the reference voltage $V_{ref}$. The output of the error amplifier is provided to a low pass filter. The low pass filter 114 then provides its output to a buffer amplifier 115. The buffer amplifier 115 produces an output signal which controls the resistance value of the adjustable resistances R1 and R2. As the resistance of the lead wires increases over time due to temperature increases, the voltage or potential difference between points A and B increases and becomes larger than the reference voltage $V_{ref}$. The difference signal is used as a control signal to reduce the resistances of the adjustable resistances R1 and R2 so as to provide constant resistance throughout the measurement circuit. This thereby avoids any influence of lead wire resistance changes upon strain detection.

Figure 2:
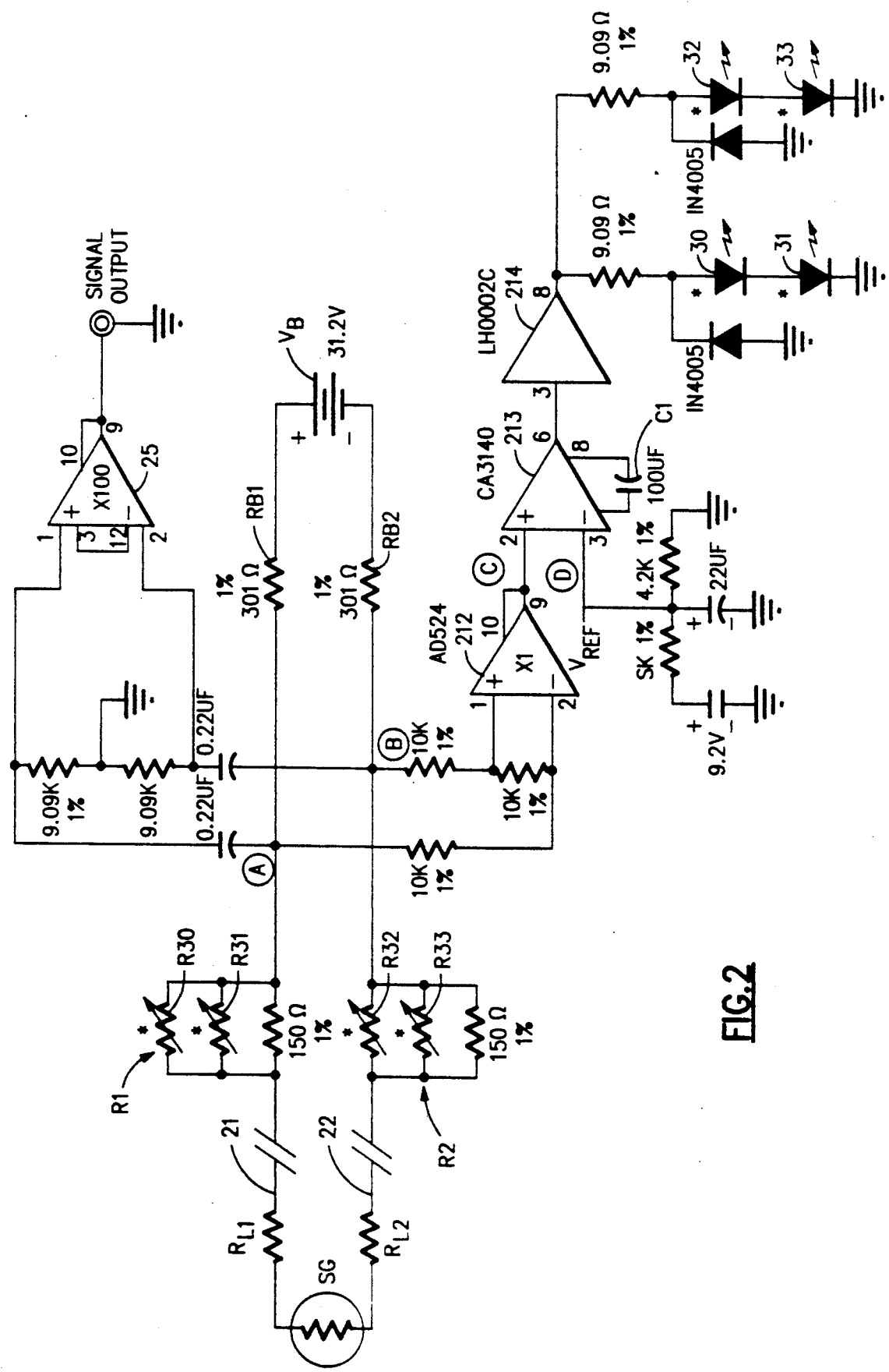
FIG. 2 is a detailed schematic diagram of an embodiment of the present invention.

The complete circuit of the present invention is illustrated in FIG. 2. In this diagram, the control mechanism for adjusting the resistance of the adjustable resistors is shown in greater detail. In this diagram, a 31.2 volt battery source $V_B$, which can comprise five batteries in series, supplies excitation to the strain gage SG. Current flows through adjustable resistances R1 and R2 as well as through the ballast resistances RB1 and RB2. Furthermore, there is an effective resistance associated with each of the lead wires 21 and 22. These resistances are represented by resistances RL1 and RL2. Amplifier 25 detects the voltage difference between points A and B of lines 21 and 22. The detected voltage difference is a signal output representative of the strain detected by the dynamic strain gage SG. The same voltage is also applied to amplifier 212 which also produces a voltage difference signal. Under normal operation, without detection of strain, the voltage between points A and B will be 12.6 volts. This voltage is sensed by the lower instrumentation amplifier 212, which converts it to a single-ended voltage at point C of approximately 4.2 volts. A reference voltage is divided down from a 9.2 volt battery and is reference voltage $V_{ref}$ at point D. The voltage at point C is supplied to the "+" terminal of operational amplifier (op amp) 213. The voltage at point D is supplied to the "−" terminal of the op amp 213. That amplifier compares the voltages appearing at its "+" and "−" terminals and generates an error signal based on the difference between the voltages at points C and D. This error signal is provided as an input to a current amplifier 214. The current amplifier drives LEDs 30, 31, 32, and 33. LEDs 30 and 31 are paired with the light responsive resistances R30 and R31 respectively. Light emitting diodes 32 and 33 are paired with light responsive resistances R32 and R33 respectively. If the lead resistances RL1 and RL2 increase, the voltage between points A and B will increase. This increased voltage is detected by the amplifier 212 and compared to the reference voltage $V_{ref}$ at amplifier 213. The resulting increased error signal drives more current through the LEDs. As a consequence, the corresponding resistances are reduced in response to the increase of light from the LEDs. The resistances decrease until the voltage between points A and B is again 12.6 volts, thus correcting for lead resistance change.

The capacitance C101 connected between pins 1 and 8 of amplifier 213 is provided to slow the response of the compensation signal. By slowing the response, the compensation circuit does not compensate for or cancel out a voltage change at points A and B which is due to a strain detection by the strain gage.

This embodiment accommodates values of lead resistances from 0 to 100 ohms in each lead and provides a current of approximately 30 milliamperes through the gage. Light-emitting diodes/photocell devices such as those used in the present invention are available from EG&G Vactec.

The circuit of the present invention compensates for the lead resistance of a dynamic strain measurement circuit. This avoids negative effects from changes of lead resistance with temperature while still providing good common-mode rejection and signal-to-noise ratio.

The adjustable resistances can be motor driven potentiometers or field effect transistors in place of the LED/photocell pairs which are illustrated in the embodiment of FIG. 2. In those other configurations, the control signal produced by the error amplifier 113 or 213 would, with current amplifier 114 or 214, control the motor to change the slide of the potentiometer or the gate of the field effect transistors. Other current controlled adjustable resistances can also be employed in place of the resistances R1 and R2 of FIG. 2.

What is claimed is:

1. A circuit for dynamic strain measurement comprising:
   a strain gage;
   a voltage source;
   adjustable resistance coupled between said voltage source and said strain gage;
   a voltage detector detecting a potential difference between two reference points in the circuit;
   a comparator comparing the detected potential difference to a reference voltage and producing an error signal proportional to a difference between said reference voltage and said detected potential difference; and
   means for adjusting the resistance of said adjustable resistance in response to said error signal.

2. The circuit of claim 1 further comprising a delay mechanism, said delay mechanism introducing a delay in compensating for changes in said detected potential difference.

3. A compensation circuit for use in a dynamic strain measurement device including a strain detection circuit:
   a strain gage;
   adjustable resistance in series with said strain gage;
   means for detecting a variation in an electrical characteristic of the measurement device;
   means, responsive to said means for detecting, for producing a control signal, said control signal setting a resistance value of said adjustable resistance.

4. The compensation circuit of claim 3 wherein said means for detecting comprises:
   an amplifier detecting a potential difference between two points between said adjustable resistance and the strain detector circuit; and
   a comparator receiving a signal from said amplifier indicative of said potential difference and comparing said signal with a reference voltage, wherein said means for producing a control signal produces said control signal on the basis of the comparison by said comparator.

5. A dynamic strain measurement circuit comprising:
   a constant voltage source;
   a first adjustable resistance coupled to one side of said constant voltage source;
   a second adjustable resistance coupled to a second side of said constant voltage source;
   a strain gage coupled to said first and second adjustable resistances;
   a potential difference detector coupled to a first point and second point of the measurement circuit, said first point being between said voltage source and said first adjustable resistance, said second point being between said voltage source and said second adjustable resistance;
   an error amplifier coupled to said potential difference detector and producing a control signal controlling a resistance value of said first and second adjustable resistances in accordance with a difference between the detected potential difference and a reference voltage.

* * * * *